W. D. HEFLIN.
SEED PLANTER.
APPLICATION FILED APR. 27, 1911.
1,010,257.
Patented Nov. 28, 1911.
2 SHEETS—SHEET 2.
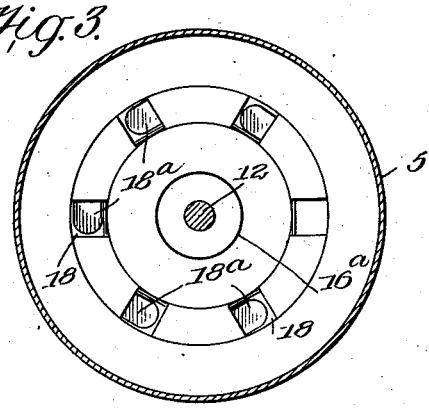
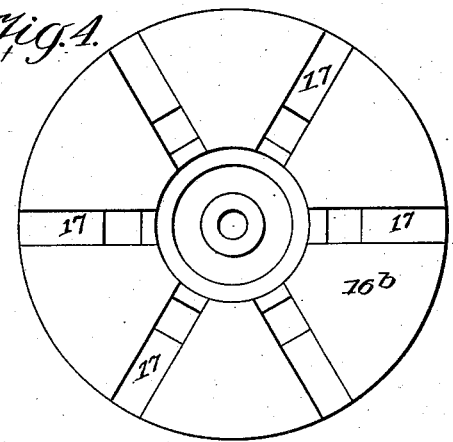
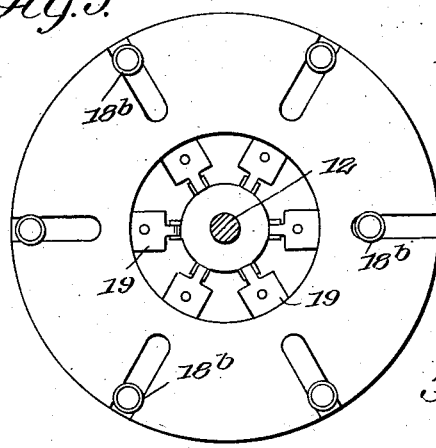
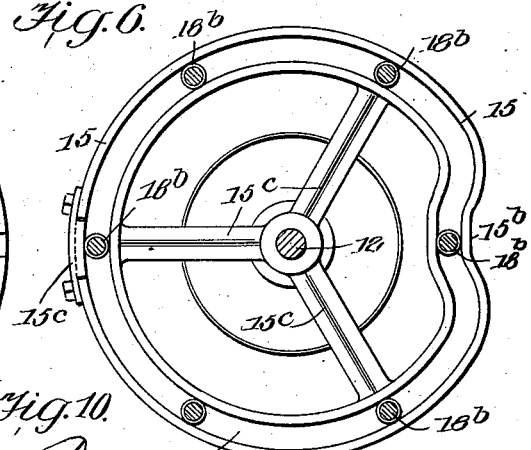
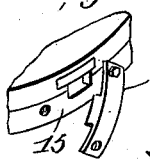
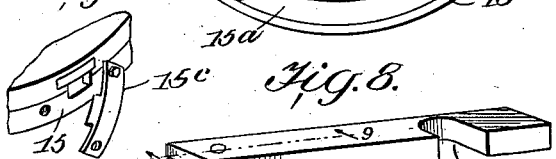
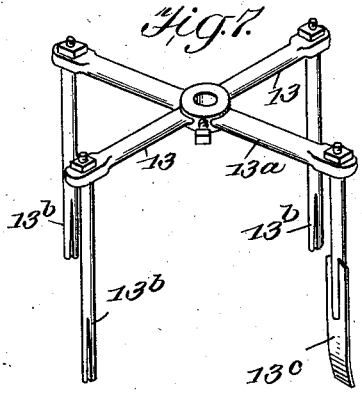
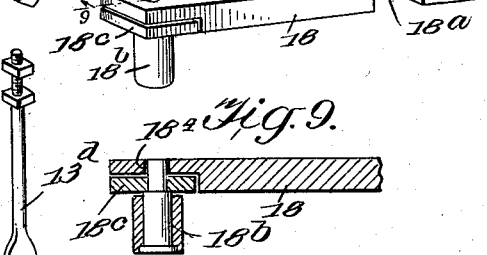
WITNESSES
Samuel E. Wade.
Amos W. Hart.
INVENTOR
WILLIAM D. HEFLIN.
BY Munn & Co.
ATTORNEYS

UNITED STATES PATENT OFFICE.

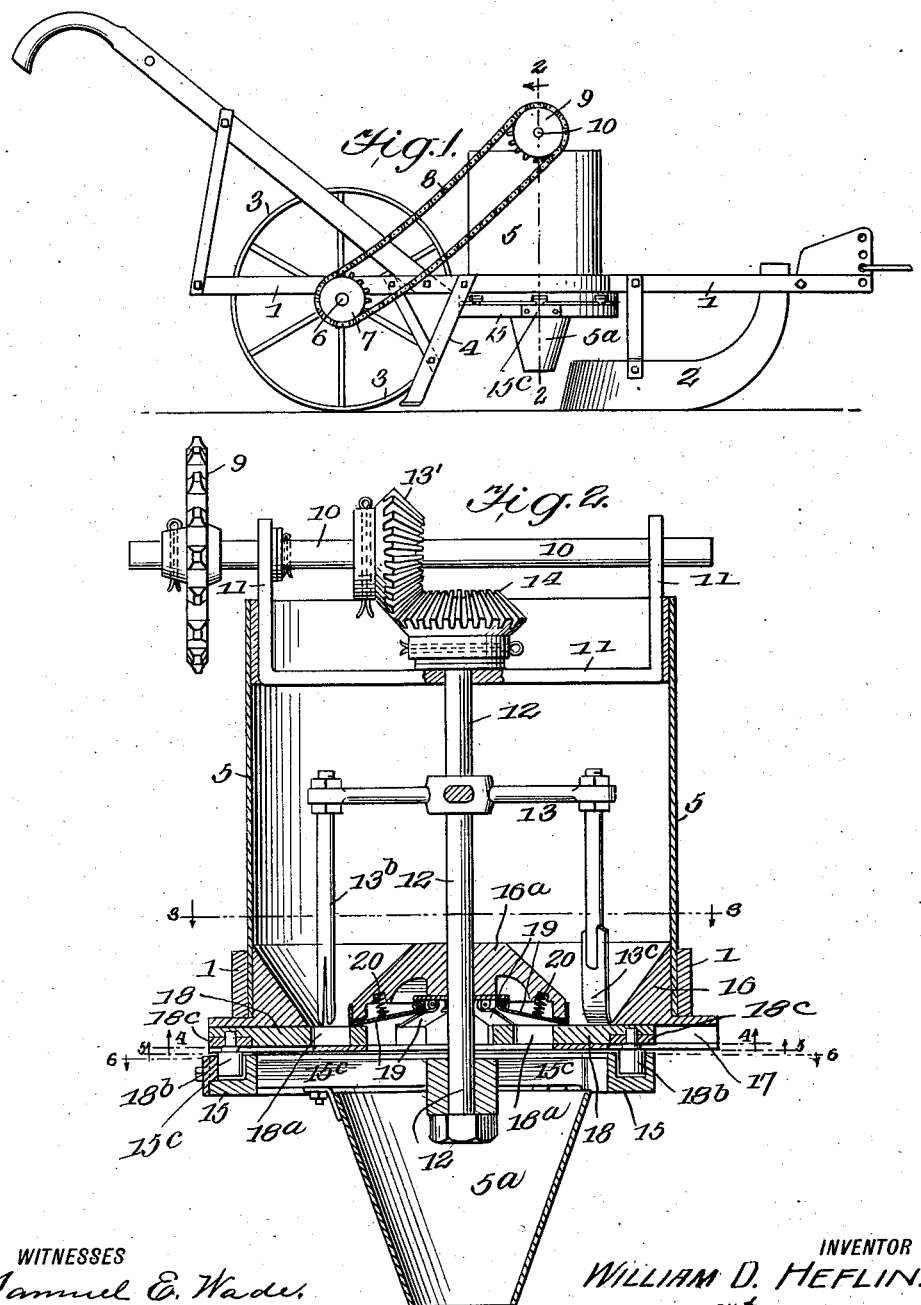

WILLIAM D. HEFLIN, OF SARDIS, MISSISSIPPI.

SEED-PLANTER.

1,010,257.  Specification of Letters Patent. Patented Nov. 28, 1911.

Application filed April 27, 1911. Serial No. 623,616.

*To all whom it may concern:*

Be it known that I, WILLIAM D. HEFLIN, a citizen of the United States, and a resident of Sardis, county of Panola, and State of Mississippi, have invented an Improvement in Seed-Planters, of which the following is a specification.

My invention is an improvement in the class of seed-planters in which slidable seed-dischargers are operated by gear connections with a wheel that travels on the ground and serves also as one of the supports of the machine.

The invention relates mainly to the construction, arrangement, and combination of parts constituting the seed-discharge mechanism, as hereinafter described and claimed, and illustrated in the accompanying drawings, in which, Figure 1 is a side view of the machine. Fig. 2 is an enlarged central vertical section on line 2—2 of Fig. 1 of the seed-hopper and seed-discharge mechanism forming an attachment thereof. Figs. 3, 4, 5 and 6 are horizontal sections on the lines 3—3, 4—4, 5—5, and 6—6, respectively, of Fig. 2. Fig. 7 is a perspective view of the seed-agitators. Fig. 8 is a perspective view of one of the seed-slides and dischargers, and Fig. 9 is a longitudinal section on the line 9—9 of Fig. 8. Fig. 10 is a detail perspective illustrating an attachment of the cam wheel required to facilitate insertion and removal of seed slides. Fig. 11 is a perspective view of a seed cut-off forming an attachment of the agitator and operated with it, the same being employed as a substitute for a brush.

Referring in the first instance to Fig. 1, the numeral 1 indicates the frame of the machine, 2 a furrow-opener, 3 a wheel traveling in rear of the furrow-opener, and in alinement therewith, 4 the furrow-closers, and 5 the seed-hopper or drum which is fixed and supported in the frame 1 at a point between the furrow-opener and the wheel.

The furrow-closers 4 are arranged slightly in advance of the wheel 3, which travels on and compacts the earth thrown into the furrows by the devices 4. The wheel is fixed on an axle 6 in the frame and a sprocket wheel 7 is also fixed on the same axle and is connected by an endless chain 8 with a similar sprocket wheel 9 that is fixed on a horizontal shaft 10 which extends across the top of the hopper 5, as shown in Fig. 2, and has its bearings in a bracket 11 which is fixed in the end of the hopper.

It is apparent that, when the machine is drawn along, the friction of the broad-rimmed wheel 3 with the soil, will cause rotation of the shaft 10 and thereby the seed-agitators and the seed-dischargers are operated, as will be presently described.

A shaft 12 is arranged centrally and vertically within the drum or hopper 5, and is operatively connected with the driving shaft 10 by means of meshing beveled gears 13 and 14. Centrally on this shaft 12 is fixed an agitator 13—see Figs. 2, 7 and 8,—and on the lower end of the shaft is keyed a cam-wheel 15. It is apparent that the agitator and the cam-wheel will be rotated with the shaft 12.

The agitator consists of a spider or horizontal frame $13^a$ having a series of pendent fingers $13^b$, whose lower ends are suitably constructed for stirring the seed. The lower ends of these fingers travel in a narrow annular trough formed in the solid metal casting 16 that constitutes the bottom of the drum or hopper. The fingers $13^b$ drag the seed into the holes or seed-cups, and a brush $13^c$ passes over the filled cavity just as a seed-slide is actuated, that is to say, adjusted in position for discharging the contents downward. In many instances, the planter will be used for planting cotton seed alone and in such case the spring clearer or brush $13^c$ will be eliminated and the device $13^d$ shown in Fig. 11 will be substituted. This consists of a pendent bar provided at the bottom with a broad plate which is attached in place of $13^c$ and in practice passes over the seed-cups or cavities and thus serves as a cut-off. It is, in fact, a valve in respect to its operation. It will be understood that the long edge or side of the plate is turned inward toward the shaft on which the spider is keyed.

The annular body of the hopper is beveled inwardly, as shown in Fig. 2, while the central portion or cone 16ª is beveled outwardly, these parts being cast integral with sector-shaped intervening portions 16ᶜ—see Fig. 4. The bottom 16 is provided with a series of radial passages 17, there being, in this instance, as indicated in Fig. 4, six of the same. The said passages extend inwardly from the outer projecting edge of the hopper bottom 16 nearly to the shaft 12, and in said passages I arrange slides 18, which are provided with cavities or pockets 18ª—see Fig. 8—to adapt them to serve as seed-dischargers. It will be noted that these cavities or pockets open at the side. In other words, they are formed as open slots.

It will be understood that the seed slide pockets are open at all times to receive a charge of seed, save when they are expelling the charge and in such case the cavity is closed from the inside bottom of the hopper. It will be further noted that the seed slides do not move underneath the seed in order to receive the charge, but are stationary and are filled by the continuous action of the agitator fingers which drag the seed into the cavities. Seed slides provided with a central opening or pocket answer well for corn or smooth grain, but will not act properly with cotton seed unless some device is employed to push the seed out of the cavity. In other words, the lint of the cotton seed clings to the continuous wall of a round hole or cavity, but in the case of the side open cavity, the release of the cotton seed is perfect, there being no adhesion whatever of the seed to the wall of the pocket.

As will be clearly understood by reference to Fig. 2, the slide-ways, or passages 17 are so arranged as to communicate freely with the trough of the hopper bottom 16, so that the seed in the hopper may enter the pockets 18ª of the slides 18 whenever the said pockets are directly below the trough and in communication with the trough, as shown at the left in Fig. 2. The right-hand slide 18 is shown projected inward so that its pocket 18ª is beneath the cone 16ª.

As shown in Figs. 2 and 6, the cam-wheel 15 is provided on its upper side with a groove 15ª which is deflected inward at one point, 15ᵇ, in the circumference of the wheel. The seed-slides 18 are provided at their outer ends with pendent pins 18ᵇ which project into, and travel in, the aforesaid groove 15ª. The positions of these pins relative to each other are indicated by the section in Fig. 6. To relieve friction, each pin is provided with a rotatable sleeve. It will now be apparent that, as the machine advances, and the transverse shaft 10 is rotated, the cam-wheel will be rotated with the vertical shaft 12, and will thereby move the said slides 18 in and out successively, the inward movement being effected when one of the pendent pins 18ᵇ traverses the inwardly bent or cam portion 15ᵇ of the cam, and that, during the rest of the period of rotation, the slides will be adjusted to their outermost position as indicated at the left in Fig. 2, which allows more than sufficient time for the pockets 18ª to fill with seed. At the left hand in Fig. 2, the slide 18, is projected inward so that the pocket 18ª is in direct communication with the hopper or trough 16. It will be seen that the contents of said pocket, being unrestrained, will fall and discharge through the conical or funnel-shaped bottom 5ª of the hopper, and thus into the furrow formed by the furrow-opener 2.

In order to provide for convenient insertion or removal and thus for substitution of seed-slides, I provide the rim of the cam groove with openings at the outer edge, as shown in Fig. 10, and an arc-shaped plate 15ᶜ is provided for closing the same. This plate is secured by lag screws and in Fig. 10 one of the screws has been detached and the plate dropped to leave the opening free for insertion of a seed slide. When the insertion has been made, the plate 15ᶜ is raised and its central lug enters the cavity or opening in the rim of the cam wheel and thus when the plate is bolted in place, the seed slide is held in the proper position.

The seed-slides will be varied in respect to size or capacity of the cavities or pockets 18ª (see Fig. 8) according to the size of the seed to be planted, such as corn, cotton, peas, etc. Thus a machine may be provided with several series of slides, one series being interchangeable with any other. But they will not require so many separate pin attachments 18ᵇ. In other words, six pins each with a rectangular plate 18ᶜ suffice for the whole number of seed-slides. The plates 18ᶜ are rectangular and fit loosely and detachably in recesses formed in the outer ends of the slides. The cylindrical shank of the pin is tight in the plate and loose in the hole 18ᵈ formed in the slides. A friction sleeve is applied to the lower portion of the pins. The plates serve as means for holding and supporting the pins and forming detachable connection of the latter with the seed-slides.

In order that the radial arms 15ᶜ of the cam-wheel—see Fig. 6—may offer no obstruction to the downward passage of the seed, they are beveled on the upper side and thus present the form of an inverted V. In order to form a cut-off for the seed which will act in such manner as to prevent the same being injured, that is to say, bruised or cut, by contact with the edge of the cone 16ª, I provide a series of spring-actuated plates 19, which are hinged beneath the cone and project beyond its rim and are upturned at the outer edge as shown in Fig. 2.

Spiral springs 20 are arranged in pockets in the under side of the cone 16ª, so as to bear on the cut-off 19, and thus hold their angular portions in easy contact with the top of the seed-dischargers 18.

It is apparent that the speed at which the cam-wheel 15 is driven and thereby the rapidity of discharge of seed may be varied by variation in the size of the sprocket wheels 7 and 9. It is further apparent that, with a certain degree of rapidity of the cam-wheel, a certain amount of grain seed will be discharged, but that this amount may be reduced by employing blank slides, that is to say, slides which are not provided with a seed pocket. My improved machine is intended chiefly for use in planting cotton-seed and corn, and these adjustments will be effected when it is required to alternate for this work.

What I claim is:

1. In a seed-planter of the type indicated, a seed hopper having a bottom provided with an annular trough, a series of radial passages communicating with the interior of the hopper, a series of seed dischargers consisting of blocks adapted to slide in the said passage-ways, and having pockets for the reception of seed, a rotatable cam wheel arranged beneath the hopper and having a cam groove in its upper side, the seed dischargers having pendent portions adapted to travel in the cam groove, and means for imparting rotation to the cam wheel whereby the seed dischargers are alternately moved outward and inward for the reception and discharge of seed, substantially as described.

2. In a seed-planter of the type indicated, the combination with a hopper having a bottom provided with a series of openings and radial passage-ways communicating therewith, of seed slides adapted to travel in said passage-ways and provided with pockets for the reception of seed, a cam wheel arranged beneath the hopper bottom and operatively connected with the seed slides, and means for rotating the cam wheel, as shown and described.

3. In a machine of the type indicated, the combination with a seed hopper having a bottom provided with an annular trough for the reception and discharge of seed, and with a series of radial passages communicating with such trough, a series of seed discharge slides arranged in the said passage-ways, and means for moving them in and out for the reception and discharge of seed, and a spring cut-off consisting of a metal plate arranged to bear upon the upper side of the said dischargers, and springs pressing them into easy contact therewith, substantially as set forth.

4. In a machine of the type indicated, the combination with a hopper having seed discharge openings in its bottom and radial passages communicating therewith, seed slides adapted to work in said passages, and means for operating them, and seed cut-offs coacting with the seed dischargers, the same consisting of plates hinged to the central portion of the hopper bottom, and springs pressing their free ends into easy contact with the said discharges, substantially as described.

5. In a machine of the type indicated, the combination of a frame, a wheel journaled therein and traveling on the ground, a hopper provided with transverse and vertical shafts geared together, sprocket mechanism connecting the transverse shaft with the axle of the aforesaid wheel, a cam wheel arranged below the hopper and fixed on the vertical shaft therein, and a series of seed slides operatively connected with such cam wheel, substantially as described.

6. In a machine of the type indicated, the combination with a seed hopper, a vertical rotatable shaft arranged centrally therein, a bottom for the hopper having an annular trough provided with openings for discharging seed, and an agitator applied to said shaft and rotating therewith, the same consisting of a spider-like frame, and a series of pendent bearings whose lower ends travel in the annular trough of the hopper, as shown and described.

7. In a machine of the type indicated, the combination with a seed hopper having discharge openings in its bottom and radial passages communicating therewith, seed slides adapted to reciprocate in said passages, and a cam for operating them, the slides having seed pockets in the form of lateral open slots, as shown and described.

8. In a machine of the type indicated, the combination with the hopper having seed discharge openings in its bottom and radial passages communicating therewith, seed slides adapted to reciprocate in such passages and provided with seed pockets formed as laterally open slots, and means for reciprocating the seed slides, as shown and described.

9. In a machine of the type indicated, the combination with a hopper having a series of radial passages in the bottom adapted for the reception of seed-discharging slides, a rotatable cam wheel arranged beneath the hopper and having a cam groove in its upper side, its rim being provided with an opening for insertion and removal of seed slides, and means for closing such openings, substantially as described.

10. In a machine of the type indicated, the combination with seed-slides having their outer ends recessed, of a removable pin attachment comprising a pin proper and a plate in which it is held pendent, the plate being adapted to fit in the recess of the slides, as shown and described.

WILLIAM D. HEFLIN.

Witnesses:
T. J. TAYLOR,
G. N. MADDUX.

Copies of this patent may be obtained for five cents each, by addressing the "Commissioner of Patents, Washington, D. C."